(12) United States Patent
Miao

(10) Patent No.: US 11,825,418 B2
(45) Date of Patent: Nov. 21, 2023

(54) ENHANCED PHYSICAL UPLINK CONTROL CHANNEL (PUCCH) POWER CONTROL

(71) Applicant: APPLE INC., Cupertino, CA (US)

(72) Inventor: Honglei Miao, Munich (DE)

(73) Assignee: APPLE INC., Cupertino, CA (US)

( * ) Notice: Subject to any disclaimer, the term of this patent is extended or adjusted under 35 U.S.C. 154(b) by 401 days.

(21) Appl. No.: 17/285,416

(22) PCT Filed: Oct. 15, 2019

(86) PCT No.: PCT/US2019/056388
§ 371 (c)(1),
(2) Date: Apr. 14, 2021

(87) PCT Pub. No.: WO2020/081602
PCT Pub. Date: Apr. 23, 2020

(65) Prior Publication Data
US 2022/0286972 A1 Sep. 8, 2022

Related U.S. Application Data

(60) Provisional application No. 62/747,008, filed on Oct. 17, 2018.

(51) Int. Cl.
*H04W 52/14* (2009.01)
*H04W 52/36* (2009.01)
(Continued)

(52) U.S. Cl.
CPC ....... *H04W 52/146* (2013.01); *H04W 52/367* (2013.01); *H04W 72/044* (2013.01); *H04W 72/23* (2023.01)

(58) Field of Classification Search
CPC ......... H04W 72/1205; H04W 72/1263; H04W 72/1289; H04W 92/18; H04W 72/1242;
(Continued)

(56) References Cited

U.S. PATENT DOCUMENTS

2018/0220415 A1 8/2018 Yin et al.
2019/0349180 A1* 11/2019 Lu ....................... H04L 27/2607
(Continued)

FOREIGN PATENT DOCUMENTS

WO 2018085044 A1 5/2018
WO 2018093103 A1 5/2018
(Continued)

OTHER PUBLICATIONS

Huawei, HiSilicon, "Remaining issues on resource allocation for PUCCH", R1-1803647, 3GPP TSG RAN WG1 Meeting #92bis, Sanya, China, Agenda Item 7.1.3.2.4, Apr. 16-20, 2018, 6 pages.
(Continued)

*Primary Examiner* — Nathan S Taylor
(74) *Attorney, Agent, or Firm* — Dorsey & Whitney LLP

(57) ABSTRACT

Technology for a Next Generation NodeB (gNB) operable to encode a physical uplink control channel (PUCCH) resource indicator field length for transmission to a user equipment (UE) for enhanced Ultra Reliable Low Latency Communications (URLLC) (eURLLC) is disclosed. The gNB can determine the PUCCH resource indicator field length that indicates a length of a PUCCH resource indicator field, wherein the PUCCH resource indicator field length is related to transmission of a number of PUCCH symbols for eURLLC. The gNB can encode the PUCCH resource indicator field length for transmission in downlink control information (DCI) to the UE.

10 Claims, 11 Drawing Sheets

(51) Int. Cl.
*H04W 72/044* (2023.01)
*H04W 72/23* (2023.01)

(58) Field of Classification Search
CPC . H04W 72/1268; H04W 72/12; H04W 72/10; H04W 52/08; H04W 52/146; H04W 52/325; H04W 52/362; H04W 52/367; H04W 52/54; H04W 72/044; H04W 72/23; H04W 52/32; H04W 72/04; H04L 1/1812; H04L 5/00; H04L 1/1861; H04L 1/1864; H04L 5/0053; H04L 5/0091; H04L 1/00
USPC .......................................................... 370/32
See application file for complete search history.

(56) References Cited

U.S. PATENT DOCUMENTS

| | | | |
|---|---|---|---|
| 2020/0044797 A1* | 2/2020 | Guo | H04W 72/51 |
| 2020/0053610 A1* | 2/2020 | Lyu | H04L 1/0031 |
| 2020/0053721 A1* | 2/2020 | Cheng | H04W 72/21 |
| 2020/0120701 A1* | 4/2020 | Peng | H04W 72/1273 |
| 2020/0337077 A1* | 10/2020 | Yoshimura | H04L 1/1864 |
| 2020/0404690 A1* | 12/2020 | Lee | H04W 72/1273 |
| 2021/0084622 A1* | 3/2021 | Choi | H04W 72/23 |
| 2021/0144694 A1* | 5/2021 | Lee | H04L 1/1812 |
| 2021/0212033 A1* | 7/2021 | Islam | H04L 1/1671 |
| 2021/0266893 A1* | 8/2021 | Lee | H04L 1/1854 |
| 2021/0314917 A1* | 10/2021 | Lee | H04W 72/02 |
| 2021/0336688 A1* | 10/2021 | Lee | H04W 4/40 |
| 2021/0400699 A1* | 12/2021 | Nory | H04W 72/0446 |
| 2022/0039023 A1* | 2/2022 | Fröberg Olsson | H04W 52/281 |

FOREIGN PATENT DOCUMENTS

| | | | | |
|---|---|---|---|---|
| WO | 2018175249 A1 | 9/2018 | | |
| WO | WO-2020069468 A1 | * | 4/2020 | ........... H04L 1/1819 |

OTHER PUBLICATIONS

NTT Docomo, Inc. , "Layer 1 enhancements for NR URLLC", R1-1811378, 3GPP TSG RAN WG1 Meeting #94bis, Chengdu, China, Agenda Item 7.2.6.2, Oct. 8-12, 2018, 18 pages.
China Telecom, et al.,"Discussion on PUCCH Resource Allocation and HARQ Codebook Determination in URLLC, R1-1808305, 3GPP TSG RAN WG1 Meeting #94, Gothenburg, Sweden, Agenda Item 7.2.6.1", Aug. 20-24, 2018 ,3 pages.
Huawei, HiSilicon, et al.,"PUCCH design for URLLC, R1-1806894, 3GPP TSG RAN WG1 Meeting #93, Busan, Korea, Agenda Item 7.1.3.2.1," May 21-25, 2018 ,2 pages.
PCT/US2019/056388, et al., International Search Report and Written Opinion , dated Jan. 31, 2020 ,10 pages.
Sharp, et al.,"PUCCH enhancements for URLLC HARQ-ACK feedback, R1-1809112, 3GPP TSG RAN WG1 Meeting #94, Gothenburg, Sweden, Agenda Item 7.2.6.1," Aug. 20-24, 2018 ,3 pages.

* cited by examiner

| TPC Command Field | Accumulated PUCCH TP adjustment [dB] |
|---|---|
| 0 | -1 |
| 1 | 0 |
| 2 | 1 |
| 3 | 3 |

FIG. 2

```
PUCCH-Config ::=                             SEQUENCE {
    resourceSetToAddModList              SEQUENCE (SIZE (1..maxNrofPUCCH-
    ResourceSets)) OF PUCCH-ResourceSet         OPTIONAL,    -- Need N
    resourceSetToReleaseList             SEQUENCE (SIZE (1..maxNrofPUCCH-
    ResourceSets)) OF PUCCH-ResourceSetId       OPTIONAL,    -- Need N
    resourceToAddModList                 SEQUENCE (SIZE (1..maxNrofPUCCH-Resources))
    OF PUCCH-Resource                           OPTIONAL,    -- Need N
    resourceToReleaseList                SEQUENCE (SIZE (1..maxNrofPUCCH-
    Resources)) OF PUCCH-ResourceId             OPTIONAL,    -- Need N
    format1                                     SetupRelease { PUCCH-FormatConfig }
                                         OPTIONAL,    -- Need M
    format2                                     SetupRelease { PUCCH-FormatConfig }
                                         OPTIONAL,    -- Need M
    format3                                     SetupRelease { PUCCH-FormatConfig }
                                         OPTIONAL,    -- Need M
    format4                                     SetupRelease { PUCCH-FormatConfig }
                                         OPTIONAL,    -- Need M
    schedulingRequestResourceToAddModList   SEQUENCE (SIZE (1..maxNrofSR-Resources))
    OF SchedulingRequestResourceConfig          OPTIONAL, -- Need N
    schedulingRequestResourceToReleaseList  SEQUENCE (SIZE (1..maxNrofSR-Resources))
    OF SchedulingRequestResourceId              OPTIONAL, -- Need N
    multi-CSI-PUCCH-ResourceList         SEQUENCE (SIZE (1..2)) OF PUCCH-ResourceId
                          OPTIONAL,-- Need M
    dl-DataToUL-ACK                      SEQUENCE (SIZE (1..8)) OF INTEGER (0..15)
                                         OPTIONAL,    -- Need M
    spatialRelationInfoToAddModList      SEQUENCE (SIZE
    (1..maxNrofSpatialRelationInfos)) OF PUCCH-SpatialRelationInfo   OPTIONAL,   --
    Need N
    spatialRelationInfoToReleaseList     SEQUENCE (SIZE
    (1..maxNrofSpatialRelationInfos)) OF PUCCH-SpatialRelationInfoId OPTIONAL,   --
    Need N
    pucch-PowerControl                          PUCCH-PowerControl
                                         OPTIONAL,    -- Need M
    pucch-ResourceIndicatorLength               INTEGER (3..5)     OPTIONAL,   -- Need M
...
}
```

FIG. 3

| R | Serving Cell ID | | DL BWP ID |
|---|---|---|---|
| | R | CORESET ID | PUCCH-RI Length |

FIG. 4

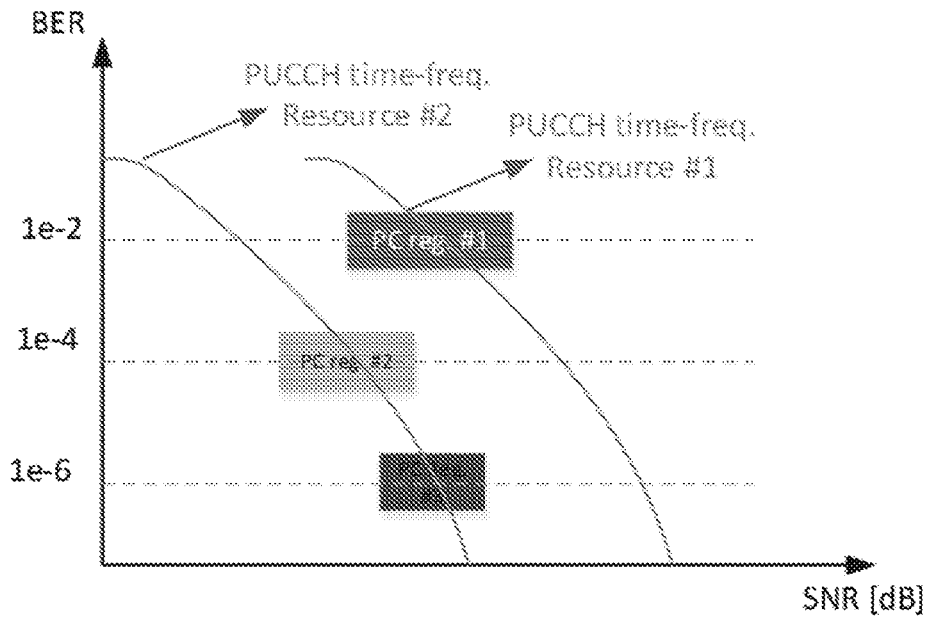

FIG. 5

```
PUCCH-PowerControl ::=              SEQUENCE {
  • deltaF-PUCCH-f0                   INTEGER (-16..15)
                                      OPTIONAL,    -- Need R
  • deltaF-PUCCH-f1                   INTEGER (-16..15)
                                      OPTIONAL,    -- Need R
  • deltaF-PUCCH-f2                   INTEGER (-16..15)
                                      OPTIONAL,    -- Need R
  • deltaF-PUCCH-f3                   INTEGER (-16..15)
                                      OPTIONAL,    -- Need R
  • deltaF-PUCCH-f4                   INTEGER (-16..15)
                                      OPTIONAL,    -- Need R
  • p0-Set                            SEQUENCE (SIZE (1..maxNrofPUCCH-P0-PerSet))
    OF P0-PUCCH                           OPTIONAL, -- Need M
  • pathlossReferenceRSs              SEQUENCE (SIZE (1..maxNrofPUCCH-
    PathlossReferenceRSs)) OF PUCCH-PathlossReferenceRS  OPTIONAL, -- Need M
  • twoPUCCH-PC-AdjustmentStates      ENUMERATED {twoStates}
                                      OPTIONAL, -- Need S
  • pucch-tpcStep                     ENUMERATED {0.25dB, 0.5dB, 1dB, 2dB} OPTIONAL,  -- Need M
  ...
}
```

FIG. 6

| TPC Command Field | Accumulated PUCCH TP adjustment [dB] |
|---|---|
| 0 | -1*pucch-tpcStep |
| 1 | 0 |
| 2 | 1*pucch-tpcStep |
| 3 | 3*pucch-tpcStep |

FIG. 7

```
PUCCH-PowerControl ::=              SEQUENCE {
  • deltaF-PUCCH-f0                   INTEGER (-16..15)
                                      OPTIONAL,   -- Need R
  • deltaF-PUCCH-f1                   INTEGER (-16..15)
                                      OPTIONAL,   -- Need R
  • deltaF-PUCCH-f2                   INTEGER (-16..15)
                                      OPTIONAL,   -- Need R
  • deltaF-PUCCH-f3                   INTEGER (-16..15)
                                      OPTIONAL,   -- Need R
  • deltaF-PUCCH-f4                   INTEGER (-16..15)
                                      OPTIONAL,   -- Need R
  • p0-Set                            SEQUENCE (SIZE (1..maxNrofPUCCH-P0-PerSet))
    OF P0-PUCCH                             OPTIONAL,  -- Need M
  • pathlossReferenceRSs              SEQUENCE (SIZE (1..maxNrofPUCCH-
    PathlossReferenceRSs)) OF PUCCH-PathlossReferenceRS  OPTIONAL,  -- Need M
  • twoPUCCH-PC-AdjustmentStates      ENUMERATED {twoStates}
                                      OPTIONAL,   -- Need S
  • pucchTpcStepSet                   SEQUENCE (SIZE (1..maxNrofPUCCH-TpcStep)) OF
    ENUMERATED {0.25dB, 0.5dB, 1dB, 2dB} OPTIONAL,   -- Need M
...
}
```

FIG. 8A

```
PUCCH-SpatialRelationInfo ::=       SEQUENCE {
  • pucch-SpatialRelationInfoId       PUCCH-SpatialRelationInfoId,
  • servingCellId                     ServCellIndex       OPTIONAL,   -- Need S
  • referenceSignal                   CHOICE {
      o ssb-Index                         SSB-Index,
      o csi-RS-Index                      NZP-CSI-RS-ResourceId,
      o srs                               SEQUENCE {
          ▪ resource                          SRS-ResourceId,
          ▪ uplinkBWP                         BWP-Id
        }
    },
  • pucch-PathlossReferenceRS-Id      PUCCH-PathlossReferenceRS-Id,
  • p0-PUCCH-Id                       P0-PUCCH-Id,
  • closedLoopIndex                   ENUMERATED { i0, i1 }
  • tpcStep-Id                        pucchTpcStep-Id
}
```

FIG. 8B

| R | Serving Cell ID | BWP ID |
|---|---|---|
| TPC-Step ID | P0 ID | PUCCH-SRI ID |

FIG. 9

ENHANCED PHYSICAL UPLINK CONTROL CHANNEL (PUCCH) POWER CONTROL

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 is a table of a mapping of a close-loop power control command field in downlink control information (DCI) to an actual transmit power adjustment in accordance with an example;

FIG. 3 illustrates Abstract Syntax Notation (ASN) code of a PUCCH configuration information element (IE) in accordance with an example;

FIG. 4 illustrates a medium access control (MAC) control element (CE) payload for configuring a PUCCH resource indication field length in accordance with an example;

FIG. 5 illustrates a PUCCH coverage performance in accordance with an example;

FIG. 6 illustrates ASN code for a PUCCH power control IE in accordance with an example;

FIG. 7 is a table of a mapping of a close-loop power control command field in DCI to an actual transmit power adjustment in accordance with an example;

FIG. 8A illustrates ASN code for a PUCCH power control IE in accordance with an example;

FIG. 8B illustrates ASN code of a PUCCH spatial relation information IE in accordance with an example;

FIG. 9 illustrates a MAC CE payload for configuring a reference power and power control value for a PUCCH spatial relation information resource in accordance with an example;

Figure 1:
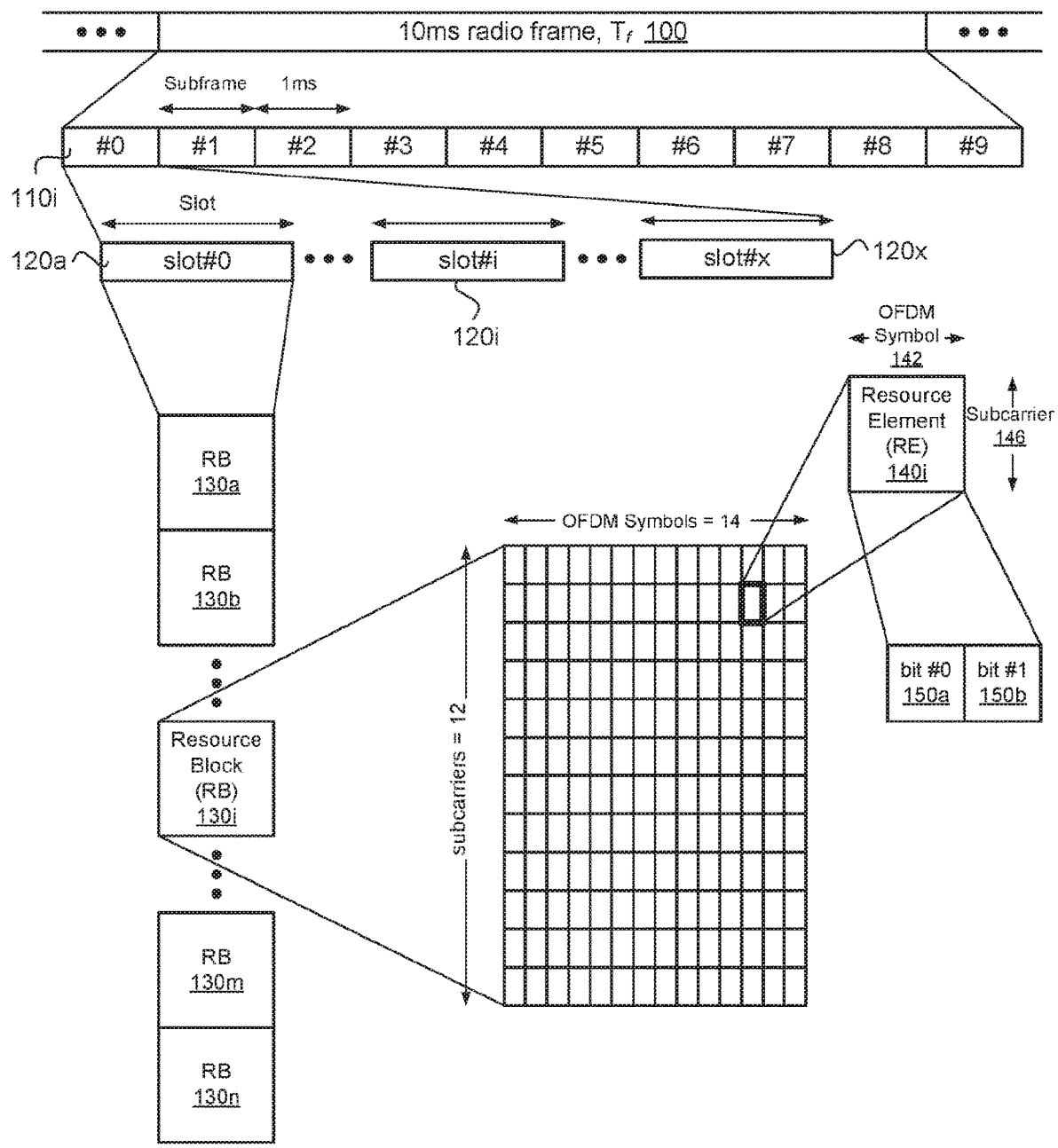
FIG. 1 illustrates a block diagram of a Third-Generation Partnership Project (3GPP) New Radio (NR) Release 15 frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Definitions

As used herein, the term "User Equipment (UE)" refers to a computing device capable of wireless digital communication such as a smart phone, a tablet computing device, a laptop computer, a multimedia device such as an iPod Touch®, or other type computing device that provides text or voice communication. The term "User Equipment (UE)" may also be referred to as a "mobile device," "wireless device," of "wireless mobile device."

As used herein, the term "Base Station (BS)" includes "Base Transceiver Stations (BTS)," "NodeBs," "evolved NodeBs (eNodeB or eNB)," "New Radio Base Stations (NR BS) and/or "next generation NodeBs (gNodeB or gNB)," and refers to a device or configured node of a mobile phone network that communicates wirelessly with UEs.

As used herein, the term "cellular telephone network," "4G cellular," "Long Term Evolved (LTE)," "5G cellular" and/or "New Radio (NR)" refers to wireless broadband technology developed by the Third Generation Partnership Project (3GPP).

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 provides an example of a 3GPP NR Release 15 frame structure. In particular, FIG. 1 illustrates a downlink radio frame structure. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into one or multiple slots 120$a$, 120$i$, and 120$x$, each with a duration, $T_{slot}$, of 1/µ ms, where µ=1 for 15 kHz subcarrier spacing, µ=2 for 30 kHz, µ=4 for 60 kHz, µ=8 for 120 kHz, and µ=16 for 240 kHz. Each slot can include a physical downlink control channel (PDCCH) and/or a physical downlink shared channel (PDSCH).

Each slot for a component carrier (CC) used by the node and the wireless device can include multiple resource blocks (RBs) 130$a$, 130$b$, 130$i$, 130$m$, and 130$n$ based on the CC frequency bandwidth. The CC can have a carrier frequency having a bandwidth. Each slot of the CC can include downlink control information (DCI) found in the PDCCH. The PDCCH is transmitted in control channel resource set (CORESET) which can include one, two or three Orthogonal Frequency Division Multiplexing (OFDM) symbols and multiple RBs.

Each RB (physical RB or PRB) can include 12 subcarriers (on the frequency axis) and 14 orthogonal frequency-division multiplexing (OFDM) symbols (on the time axis) per slot. The RB can use 14 OFDM symbols if a short or normal cyclic prefix is employed. The RB can use 12 OFDM symbols if an extended cyclic prefix is used. The resource block can be mapped to 168 resource elements (REs) using short or normal cyclic prefixing, or the resource block can be mapped to 144 REs (not shown) using extended cyclic prefixing. The RE can be a unit of one OFDM symbol 142 by one subcarrier (i.e., 15 kHz, 30 kHz, 60 kHz, 120 kHz, and 240 kHz) 146.

Each RE 140$i$ can transmit two bits 150$a$ and 150$b$ of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP NR Release 15 frame structure provides examples of the way in which data is transmitted, or the transmission mode. The example is not intended to be limiting. Many of the Release 15 features will evolve and change in the 5G frame structures included in 3GPP LTE Release 15, MulteFire Release 1.1, and beyond. In such a system, the design constraint can be on co-existence with multiple 5G numerologies in the same carrier due to the coexistence of different network services, such as eMBB (enhanced Mobile Broadband), mMTC (massive Machine Type Communications or massive IoT) and URLLC (Ultra Reliable Low Latency Communications or Critical Communications). The carrier in a 5G system can be above or below 6 GHz. In one embodiment, each network service can have a different numerology.

In one example, with respect to ultra-reliable low latency communication, one area of interest is improved reliability and reduced latency for different use cases, such as factory automation, transport industry and electrical power distribution with potentially more strict specifications than considered in New Radio (NR) Release-15. Some of the uses cases considered for Release-16 may necessitate a reliability level of 1-$10^6$ and a radio access network (RAN) latency on the level of sub-milliseconds, e.g., 0.5 to 1 ms. Moreover, for Release-16, there can be a more diverse mix of traffic with different latency and reliability specifications than compared to Release-15, ranging from eMBB to URLLC or enhanced URLLC (eURLLC). One area of interest is whether/how to enable enhanced reporting procedure/feedback for hybrid automatic repeat request acknowledgement (HARQ-ACK), so as to achieve enhanced HARQ-ACK multiplexing on a physical uplink shared channel (PUSCH) and a physical uplink control channel (PUCCH), finer indication for HARQ feedback timing, e.g. symbol-level, half-slot, etc.

In NR Rel-15, when uplink control information (UCI) is transmitted on the PUCCH, the reliability specification can differ significantly if UCI is related to eMBB or URLLC or eURLLC. For PUCCH format 0 and 1, the number of physical resource blocks (PRBs) equals one, and due to the observation that using more PRBs makes PUCCH sensitive to frequency selective fading channel, different reliability can therefore be achieved by different number of symbols and/or power adjustment.

In one example, a number of PUCCH symbols can be dynamically indicated in downlink control information (DCI) using a field "PUCCH resource indicator", wherein multiple PUCCH resources can be defined with a different number of symbols for the PUCCH resource set associated with a certain number of information bits to be carried by the PUCCH. Power adjustments can be realized by using PUCCH spatial relation information, which can be defined to incorporate multiple power settings (such as UE-and-beam-specific power control offset) and possibly up to two closed-loop power control components associated to a single transmit power control (TPC) table. Further, different PUCCH power settings can only be selected using radio resource control (RRC) reconfiguration signaling as well as medium access control (MAC) control element (CE) based activation signaling, which can be too slow in a mixed services scenario where a transmitted HARQ-ACK can be changed from being related to eMBB to related to URLLC/eURLLC between two consecutive PUCCH transmission opportunities.

In one example, enhancements of PUCCH power settings are described herein so as to achieve more dynamic and flexible power control adjustments to be necessitated in the envisioned eURLLC use cases. The enhanced power control techniques for PUCCH in eURLLC use cases described herein enable more dynamic adjustment for PUCCH power control configurations. For example, a close-loop power control step can be configured semi-statically or dynamically, instead of being a fixed value in Release-15. Moreover, a reference power and power control value can be dynamically (re)configured in a beam-resource-specific manner.

As described in further detail below, a first technique can involve an RRC configurable PUCCH resource indicator field. In the first technique, a field length of a "PUCCH resource indicator" in downlink control information (DCI) can be configured by RRC signaling instead of being a fixed length of 3 bits, as in Release-15. A second technique can involve a MAC CE configuring PUCCH resource indicator field. In the second technique, a new MAC CE can be used to signal the length of PUCCH Resource Indication field in DCI. A third technique can involve a configurable close-loop power control value. In the third technique, a flexible power control value can be configured, instead of being fixed as in Release-15. The third technique can be further divided into three possible options. A first option can involve an RRC configurable power control value. In the first option, the power control value can be configured as an RRC parameter in a PUCCH-PowerControl, so that the power control value can be adjusted by RRC reconfiguration signaling. A second option can involve an RRC configurable beam-resource specific power control value. In the second option, the power control value can be configured as a set of supported values in a PUCCH-PowerControl, and a PUCCH-SpatialRelation-Info can include a parameter "tpcStep-Id" which signals an index of a selected PUCCH-TpcStep in the pucchTpcStep-Set defined in the PUCCH-PowerControl. A third option can involve a MAC CE signaling a beam-specific reference power and power control value. In the third option, a new MAC CE can be used to more dynamically adjust the reference power, as well as the power control value for a particular PUCCH beam pair link (BPL) PUCCH-SpatialRelationInfo. The techniques described herein can enable more dynamic adjustments for the power control feature for eURLLC use cases in Release-16, which can improve the resulted overall system spectrum and energy efficiency.

In one example, in NR Release-15, PUCCH-Resources can define time-frequency resources in terms of a number of symbols and resource blocks for a respective PUCCH transmission, and can be grouped into a particular set based on a number of information bits for uplink control information (UCI) to be carried by a PUCCH and configured by RRC signaling. A spatial information parameter PUCCH-SpatialRelationInfo can include a beam pair link (BPL) correspondence defining an aligned downlink (DL) and uplink (UL) beam pairs signaled by indices of synchronization signal block (SSB), channel state information reference signal (CSI-RS) and sounding reference signal (SRS), UE-BPL-specific reference power settings P_o, and close-loop power control state. A mapping between a PUCCH-resource (time-frequency resource) and a BPL-power-resource defined by the spatial information parameter of PUCCH-SpatialRelationInfo can be activated by a MAC CE.

FIG. 2 illustrates an example of a table of a mapping of a close-loop power control command field in downlink control information (DCI) to actual transmit power adjustments. For close-loop power control, the close-loop transmission power (TP) adjustment can be signaled in the DCI. For example, for a given transmit power control (TPC) command field (e.g., 0, 1, 2 or 3), a corresponding accumulated PUCCH TP adjustment (in dB) (e.g., −1, 0, 1 or 3) can be defined, respectively.

For mixed services support, a PUCCH carrying HARQ-ACK information is to fulfill different reliability specifications for different services. For each supported service s, s=1, 2 . . . , $N_S$, to enable PUCCH link adaptation for better trade-off between coverage and spectrum efficiency, $R_s^{TF}$ time-frequency resources can be designed for PUCCH HARQ-ACK resource(s). Depending on the reliability specification, for each time-frequency resource $1 \le r_s^{TF} \le R_s^{TF}$, $B_{s,r_s}^{TF}$ BPLs with a service-beam-specific reference power setting and a close-loop power control state can be configured to achieve necessitated spatial diversity. As a result, a total number of PUCCH-resources $N_{HARQ\text{-}ACK}$ configured for a set used for HARQ-ACK, i.e., a first configured PUCCH-resource set, can be equal to:

$$N_{HARQ\text{-}ACK} = \Sigma_{s=1}^{N_S} \Sigma_{r_s^{TF}=1}^{R_s^{TF}} B_{s,r_s}^{TF}.$$

In one example, when $N_{HARQ\text{-}ACK}$ is not more than 8, these resources can be explicitly selected by a "PUCCH resource indicator" in DCI. However, for concurrent support of even more services in Release-16, $N_{HARQ\text{-}ACK} > 8$. For example, if there are 3 services to be supported, and each of which is allocated with PUCCH time-frequency resources for better spectrum efficiency adaptation, and two BPLs for spatial diversity, this would result in 3*2*2=12 PUCCH-resources configured in the PUCCH set for a HARQ-ACK only information transmission. In Release-15, when $N_{HARQ\text{-}ACK} > 8$, the PUCCH resource indicator signals a subset of a PUCCH-resource set, and the PUCCH resource in the signaled subset can be chosen according to a first control channel element (CCE) index used by the scheduling PDCCH. If a particular PUCCH resource is desired, then PDCCH scheduling is to be carefully carried out so that the first CCE index together with the signaled PUCCH-resource subset can actually select the desired PUCCH resource. Since this approach in Release-15 complicates the PDCCH scheduling procedure, the techniques described below can mitigate these issues.

In one configuration, a first technique can involve an RRC configurable PUCCH resource indicator field. In this technique, a field length of "PUCCH resource indicator" in DCI can be configured by RRC signaling instead of being a fixed length of 3 bits, as in Release-15. Specifically, a new parameter "PUCCH-ResourceIndicatorLength" can be added to a "PUCCH-Config".

FIG. 3 illustrates an example of Abstract Syntax Notation (ASN) code of a PUCCH configuration information element (IE). The PUCCH configuration IE can include a new parameter "PUCCH-ResourceIndicatorLength", which can be an integer ranging from 3 to 5, inclusive. In other words, the new parameter "PUCCH-ResourceIndicatorLength" can indicate a value of 3, 4 or 5. The PUCCH-ResourceIndicatorLength parameter can be configured in PUCCH-Config so that the PUCCH resource indicator field in DCI can be configured by RRC signaling.

In one configuration, a second technique can involve a MAC CE configuring PUCCH resource indicator field. In this technique, to more dynamically adjust the PUCCH resource indicator length, MAC CE based signaling can be employed. For example, a new MAC CE with a fixed payload size can be used. Specifically, a new MAC CE protocol data unit (PDU) with a new logical channel ID (LCID) signaling the length of the PUCCH Resource Indication field in DCI can be defined.

FIG. 4 illustrates an example of a medium access control (MAC) control element (CE) payload for configuring a PUCCH resource indication field length. The MAC CE with a fixed payload size can be used to more dynamically adjust the PUCCH resource indicator length. The MAC CE can include various fields, such as a serving cell ID, a DL BWP ID, a CORESET ID, and a PUCCH-RI length. The serving cell ID can indicate an identity of a serving cell for which the MAC CE applies. The length of the serving cell ID field can be 5 bits. The DL BWP ID field can contain a BWP-Id of a downlink bandwidth part in which a CORESET and associated DCI apply. The length of the BWP ID field can be 2 bits. The CORESET ID can indicate a control resource set identified with ControlResourceSetId in which the DCI is being transmitted. The length of the CORESET ID field can be 2 bits. The PUCCH-RI length field can contain a length of the PUCCH resource indication field in the DCI. The length of the PUCCH-RI length field can be 3 bits. Further, the new configuration can be applied in x ms, e.g., x=3, after the HARQ-ACK has been sent in response to a physical downlink shared channel (PDSCH) carrying the MAC CE.

FIG. 5 illustrates an example of a PUCCH coverage performance. The coverage performance of a PUCCH transmission can be defined in terms of a bit error rate (BER) in relation to a signal to noise ratio (SNR) (in dB). Given a PUCCH resource, a BER specification and a channel power variation rate, having a flexible power control value for different scenarios would be beneficial, rather than a fixed power control value as in Release-15. For example, given the same level of BER degradation tolerance, the power control region #1 has a largest SNR region while power control region #2 has a smallest SNR region.

In one configuration, a third technique can involve a configurable close-loop power control value. To support a flexible power control value, three options are described below.

In one example, a first option can involve an RRC configurable power control value. In this option, the power control value can be configured as an RRC parameter in a PUCCH-PowerControl, so that the power control value can be adjusted by RRC reconfiguration signaling, instead of being a fixed value. Specifically, a "PUCCH-tpcStep" parameter can be added to the PUCCH-PowerControl.

FIG. 6 illustrates an example of ASN code for a PUCCH power control IE. For example, a PUCCH-PowerControl can include a "PUCCH-tpcStep" parameter. In this example, the "PUCCH-tpcStep" parameter can have a value of 0.25 dB, 0.5 dB, 1 dB or 2 dB.

FIG. 7 illustrates an example of a table of a mapping of a close-loop power control command field in downlink control information (DCI) to actual transmit power adjustments. For close-loop power control, the close-loop transmission power (TP) adjustment can be signaled in the DCI. For example, for a given transmit power control (TPC) command field (e.g., 0, 1, 2 or 3), a corresponding accumulated PUCCH TP adjustment (in dB) (e.g., −1*pucch-tpc-Step, 0, 1*pucch-tpcStep or 3*pucch-tpcStep) can be defined, respectively.

In one example, with the example pucch-tpcStep given above, the TPC adjustment can have the following ranges: Range-1 can include: −0.25 dB, 0, 0.25 dB, 0.75 dB, Range-2 can include: −0.5 dB, 0, 0.5 dB, 1.5 dB, Range-3 can include: −1 dB, 0, 1 dB, 2 dB, and Range-4 can include: −2 dB, 0, 2 dB, 6 dB.

In one example, a second option can involve an RRC configurable beam-resource specific power control value. In this option, the power control value can be configured as a set of supported values in a PUCCH-PowerControl so that the supported values of the power control value can be adjusted by RRC reconfiguration signaling. Further, a maximum number of supported TPC values "maxNrofPUCCH-TpcStep" can be defined in the 3GPP TS.

FIG. 8A illustrates an example of ASN code for a PUCCH power control IE. The PUCCH power control IE (or PUCCH-PowerControl) can include the maximum number of supported TPC values "maxNrofPUCCH-TpcStep". For example, the "maxNrofPUCCH-TpcStep" parameter can have a value of 0.25 dB, 0.5 dB, 1 dB or 2 dB.

FIG. 8B illustrates an example of ASN code of a PUCCH spatial relation information IE. The PUCCH spatial relation information IE (or PUCCH-SpatialRelationInfo) can include a parameter "tpcStep-Id", which can signal an index of a selected PUCCH-TpcStep in a pucchTpcStepSet defined in the PUCCH-PowerControl.

In one example, with the second option, the close-loop power control value can be chosen in a beam-resource-specific manner.

In one example, a third option can involve a MAC CE signaling the beam-specific reference power and power control value. In order to more dynamically adjust the reference power as well as the power control value for a particular PUCCH BPL addressed by pucch-SpatialRelationInfold, a new MAC CE can be designed and added to the 3GPP TS. For example, a new LCID for a corresponding MAC CE can be defined, and a payload of this MAC CE can be described as follows.

FIG. 9 illustrates an example of a MAC CE payload for configuring a reference power and power control value for a PUCCH spatial relation information resource (PUCCH-SpatialRelationInfo resource). The MAC CE can be used to more dynamically adjust the reference power as well as the power control value for a particular PUCCH BPL addressed by the pucch-SpatialRelationInfold. The MAC CE can include various fields, such as a serving cell ID, a DL BWP ID, a PUCCH-SRI ID, a P0 ID, and a TPC-Step ID. The serving cell ID can be a field that indicates an identity of a serving cell for which the MAC CE applies. The length of the serving cell ID field can be 5 bits. The BWP ID field can include a BWP-Id of an uplink bandwidth part in which the PUCCH-SpatialRelationInfo applies. The length of the BWP ID field can be 2 bits. The PUCCH-SRI ID field can include an ID of the PUCCH-SpatialRelationInfo for which the reference power p0 and TPC value is to be configured by the MAC CE. The length of the PUCCH-SRI ID field can be 3 bits. The P0 ID field can include an ID of a p0 value in a p0-Set in the PUCCH-PowerControl to be configured for the PUCCH-SpatialRelationInfo. The length of the P0 ID field can be 3 bits. The TPC-Step ID field can include an ID of a tpcStep value in the pucchTpsStepSet in the PUCCH-PowerControl to be configured for the PUCCH-SpatialRelationInfo. The length of the TPC-Step ID field can be 2 bits. Further, the new configuration can be applied in x ms, e.g., x=3, after the HARQ-ACK has been sent in response to the PDSCH carrying the MAC CE.

Figure 10:
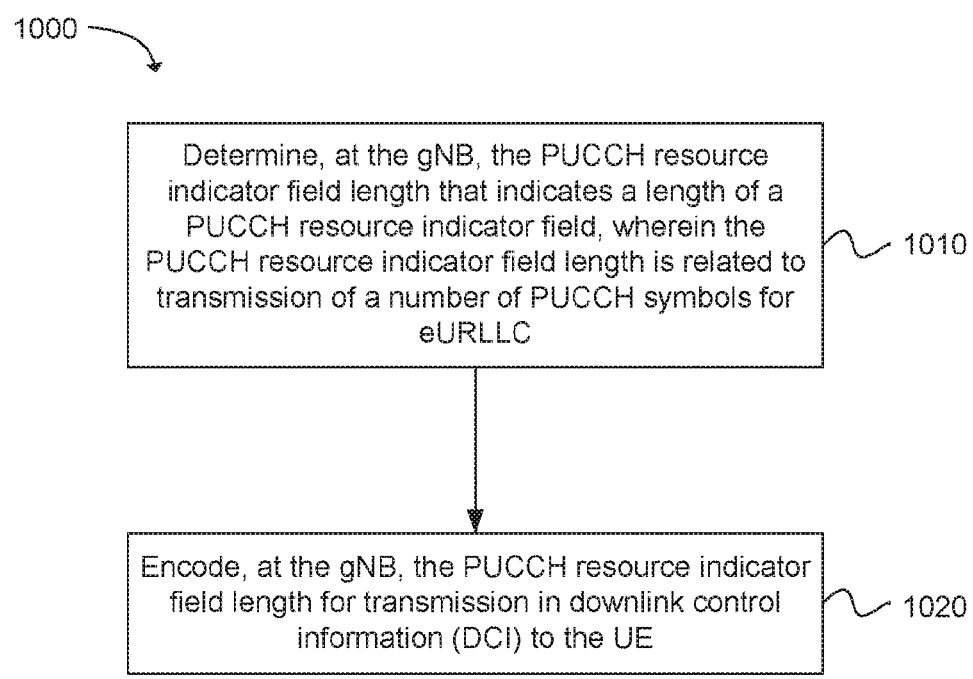
FIG. 10 depicts functionality of a Next Generation NodeB (gNB) operable to encode a physical uplink control channel (PUCCH) resource indicator field length for transmission to a user equipment (UE) for enhanced Ultra Reliable Low Latency Communications (URLLC) (eURLLC) in accordance with an example.

Another example provides functionality 1000 of a Next Generation NodeB (gNB) operable to encode a physical uplink control channel (PUCCH) resource indicator field length for transmission to a user equipment (UE) for enhanced Ultra Reliable Low Latency Communications (URLLC) (eURLLC), as shown in FIG. 10. The gNB can comprise one or more processors configured to determine, at the gNB, the PUCCH resource indicator field length that indicates a length of a PUCCH resource indicator field, wherein the PUCCH resource indicator field length is related to transmission of a number of PUCCH symbols for eURLLC, as in block 1010. The gNB can comprise one or more processors configured to encode, at the gNB, the PUCCH resource indicator field length for transmission in downlink control information (DCI) to the UE, as in block 1020. In addition, the gNB can comprise a memory interface configured to send to a memory the PUCCH resource indicator field length.

Figure 11:
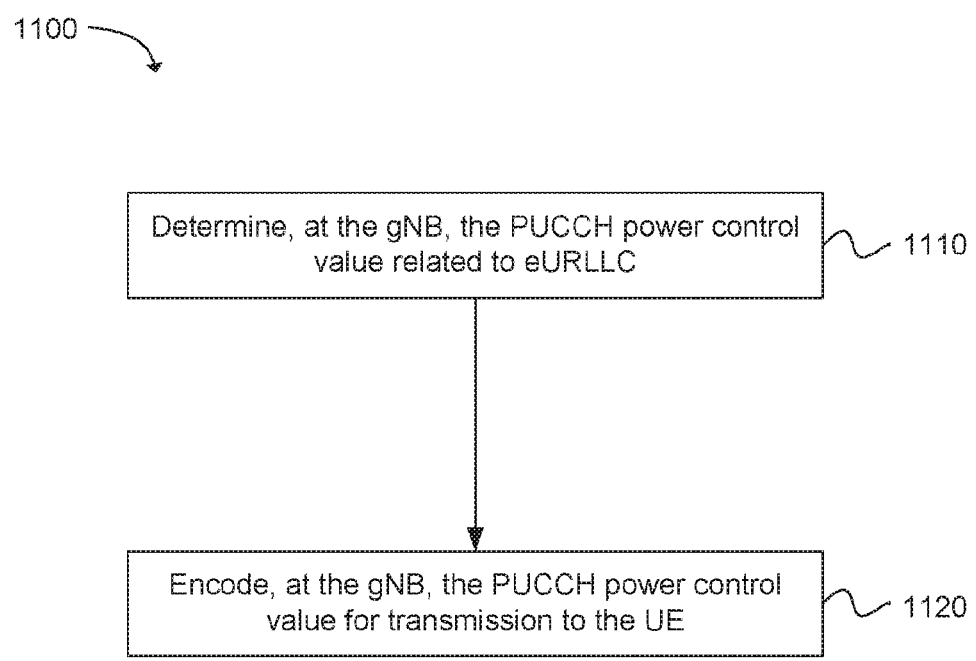
FIG. 11 depicts functionality of a Next Generation NodeB (gNB) operable to encode a physical uplink control channel (PUCCH) power control value for transmission to a user equipment (UE) for enhanced Ultra Reliable Low Latency Communications (URLLC) (eURLLC) in accordance with an example.

Another example provides functionality 1100 of a Next Generation NodeB (gNB) operable to encode a physical uplink control channel (PUCCH) power control value for transmission to a user equipment (UE) for enhanced Ultra Reliable Low Latency Communications (URLLC) (eURLLC), as shown in FIG. 11. The gNB can comprise one or more processors configured to determine, at the gNB, the PUCCH power control value related to eURLLC, as in block 1110. The gNB can comprise one or more processors configured to encode, at the gNB, the PUCCH power control value for transmission to the UE, as in block 1120. In addition, the gNB can comprise a memory interface configured to send to a memory the PUCCH power control value.

Figure 12:
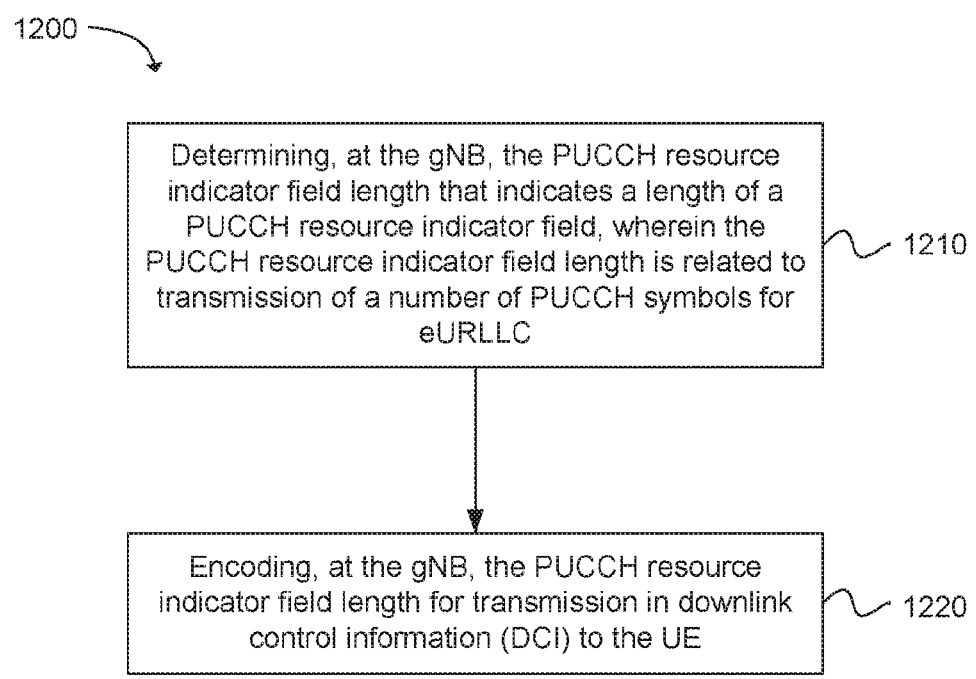
FIG. 12 depicts a flowchart of a machine readable storage medium having instructions embodied thereon for encoding a physical uplink control channel (PUCCH) resource indicator field length for transmission from a Next Generation NodeB (gNB) to a user equipment (UE) in accordance with an example.

Another example provides at least one machine readable storage medium having instructions 1200 embodied thereon for encoding a physical uplink control channel (PUCCH) resource indicator field length for transmission from a Next Generation NodeB (gNB) to a user equipment (UE), as shown in FIG. 12. The instructions can be executed on a machine, where the instructions are included on at least one computer readable medium or one non-transitory machine readable storage medium. The instructions when executed by one or more processors perform: determining, at the gNB, the PUCCH resource indicator field length that indicates a length of a PUCCH resource indicator field, wherein the PUCCH resource indicator field length is related to transmission of a number of PUCCH symbols for eURLLC, as in block 1210. The instructions when executed by the one or more processors perform: encoding, at the gNB, the PUCCH resource indicator field length for transmission in downlink control information (DCI) to the UE, as in block 1220.

Figure 13:
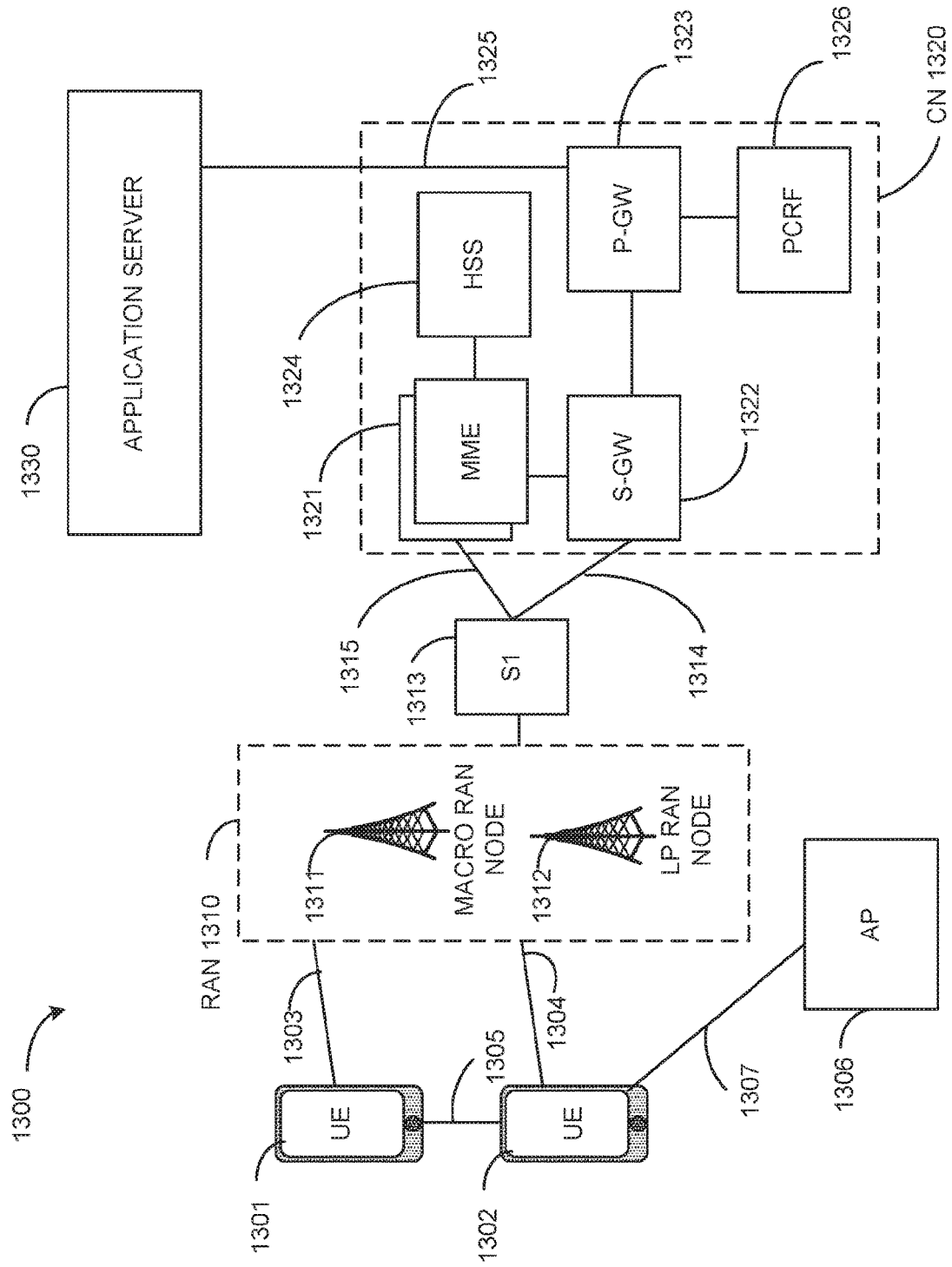
FIG. 13 illustrates an architecture of a wireless network in accordance with an example.

FIG. 13 illustrates an architecture of a system 1300 of a network in accordance with some embodiments. The system 1300 is shown to include a user equipment (UE) 1301 and a UE 1302. The UEs 1301 and 1302 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1301 and 1302 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1301 and 1302 may be configured to connect, e.g., communicatively couple, with a radio access network (RAN) 1310—the RAN 1310 may be, for example, an Evolved Universal Mobile Telecommunications System (UMTS) Terrestrial Radio Access Network (E-UTRAN), a NextGen RAN (NG RAN), or some other type of RAN. The UEs 1301 and 1302 utilize connections 1303 and 1304, respectively, each of which comprises a physical communications interface or layer (discussed in further detail below); in this example, the connections 1303 and 1304 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1301 and 1302 may further directly exchange communication data via a ProSe interface 1305. The ProSe interface 1305 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1302 is shown to be configured to access an access point (AP) 1306 via connection 1307. The connection 1307 can comprise a local wireless connection, such as a connection consistent with any IEEE 802.15 protocol, wherein the AP 1306 would comprise a wireless fidelity (WiFi®) router. In this example, the AP 1306 is shown to be connected to the Internet without connecting to the core network of the wireless system (described in further detail below).

The RAN 1310 can include one or more access nodes that enable the connections 1303 and 1304. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 1310 may include one or more RAN nodes for providing macrocells, e.g., macro RAN node 1311, and one or more RAN nodes for providing femtocells or picocells (e.g., cells having smaller coverage areas, smaller user capacity, or higher bandwidth compared to macrocells), e.g., low power (LP) RAN node 1312.

Any of the RAN nodes 1311 and 1312 can terminate the air interface protocol and can be the first point of contact for the UEs 1301 and 1302. In some embodiments, any of the RAN nodes 1311 and 1312 can fulfill various logical functions for the RAN 1310 including, but not limited to, radio network controller (RNC) functions such as radio bearer management, uplink and downlink dynamic radio resource management and data packet scheduling, and mobility management.

In accordance with some embodiments, the UEs 1301 and 1302 can be configured to communicate using Orthogonal Frequency-Division Multiplexing (OFDM) communication signals with each other or with any of the RAN nodes 1311 and 1312 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1311 and 1312 to the UEs 1301 and 1302, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1301 and 1302. The physical downlink control channel (PDCCH) may carry information about the transport format and resource allocations related to the PDSCH channel, among other things. It may also inform the UEs 1301 and 1302 about the transport format, resource allocation, and H-ARQ (Hybrid Automatic Repeat Request) information related to the uplink shared channel. Typically, downlink scheduling (assigning control and shared channel resource blocks to the UE 1302 within a cell) may be performed at any of the RAN nodes 1311 and 1312 based on channel quality information fed back from any of the UEs 1301 and 1302. The downlink resource assignment information may be sent on the PDCCH used for (e.g., assigned to) each of the UEs 1301 and 1302.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1310 is shown to be communicatively coupled to a core network (CN) 1320—via an S1 interface 1313. In embodiments, the CN 1320 may be an evolved packet core (EPC) network, a NextGen Packet Core (NPC) network, or some other type of CN. In this embodiment the S1 interface 1313 is split into two parts: the S1-U interface 1314, which carries traffic data between the RAN nodes 1311 and 1312 and the serving gateway (S-GW) 1322, and the S1-mobility management entity (MME) interface 1315, which is a signaling interface between the RAN nodes 1311 and 1312 and MMEs 1321.

In this embodiment, the CN 1320 comprises the MMEs 1321, the S-GW 1322, the Packet Data Network (PDN) Gateway (P-GW) 1323, and a home subscriber server (HSS) 1324. The MMEs 1321 may be similar in function to the control plane of legacy Serving General Packet Radio Service (GPRS) Support Nodes (SGSN). The MMEs 1321 may manage mobility aspects in access such as gateway selection and tracking area list management. The HSS 1324 may comprise a database for network users, including subscription-related information to support the network entities' handling of communication sessions. The CN 1320 may comprise one or several HSSs 1324, depending on the number of mobile subscribers, on the capacity of the equipment, on the organization of the network, etc. For example, the HSS 1324 can provide support for routing/roaming, authentication, authorization, naming/addressing resolution, location dependencies, etc.

The S-GW 1322 may terminate the S1 interface 1313 towards the RAN 1310, and routes data packets between the RAN 1310 and the CN 1320. In addition, the S-GW 1322 may be a local mobility anchor point for inter-RAN node handovers and also may provide an anchor for inter-3GPP mobility. Other responsibilities may include lawful intercept, charging, and some policy enforcement.

The P-GW 1323 may terminate an SGi interface toward a PDN. The P-GW 1323 may route data packets between the EPC network 1323 and external networks such as a network including the application server 1330 (alternatively referred to as application function (AF)) via an Internet Protocol (IP) interface 1325. Generally, the application server 1330 may be an element offering applications that use IP bearer resources with the core network (e.g., UMTS Packet Services (PS) domain, LTE PS data services, etc.). In this embodiment, the P-GW 1323 is shown to be communicatively coupled to an application server 1330 via an IP communications interface 1325. The application server 1330 can also be configured to support one or more communication services (e.g., Voice-over-Internet Protocol (VoIP) sessions, PTT sessions, group communication sessions, social networking services, etc.) for the UEs 1301 and 1302 via the CN 1320.

The P-GW 1323 may further be a node for policy enforcement and charging data collection. Policy and Charging Enforcement Function (PCRF) 1326 is the policy and charging control element of the CN 1320. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1326 may be communicatively coupled to the application server 1330 via the P-GW 1323. The application server 1330 may signal the PCRF 1326 to indicate a new service flow and select the appropriate Quality of Service (QoS) and charging parameters. The PCRF 1326 may provision this rule into a Policy and Charging Enforcement Function (PCEF) (not shown) with the appropriate traffic flow template (TFT) and QoS class of identifier (QCI), which commences the QoS and charging as specified by the application server 1330.

Figure 14:
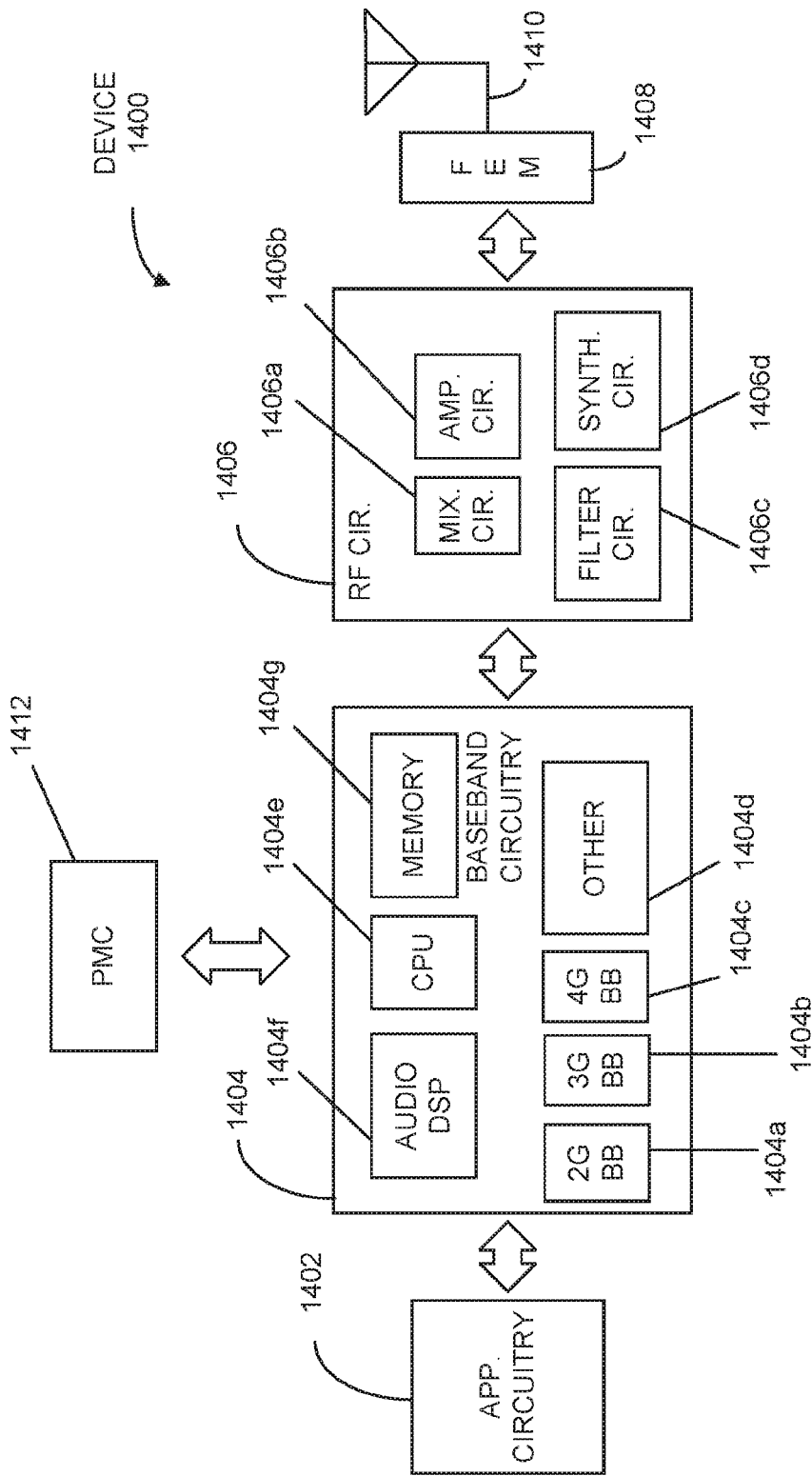
FIG. 14 illustrates a diagram of a wireless device (e.g., UE) in accordance with an example.

FIG. 14 illustrates example components of a device 1400 in accordance with some embodiments. In some embodiments, the device 1400 may include application circuitry 1402, baseband circuitry 1404, Radio Frequency (RF) circuitry 1406, front-end module (FEM) circuitry 1408, one or more antennas 1410, and power management circuitry (PMC) 1412 coupled together at least as shown. The components of the illustrated device 1400 may be included in a UE or a RAN node. In some embodiments, the device 1400 may include less elements (e.g., a RAN node may not utilize application circuitry 1402, and instead include a processor/controller to process IP data received from an EPC). In some embodiments, the device 1400 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1402 may include one or more application processors. For example, the application circuitry 1402 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1400. In some embodiments, processors of application circuitry 1402 may process IP data packets received from an EPC.

The baseband circuitry 1404 may include circuitry such as, but not limited to, one or more single-core or multi-core processors. The baseband circuitry 1404 may include one or more baseband processors or control logic to process baseband signals received from a receive signal path of the RF circuitry 1406 and to generate baseband signals for a transmit signal path of the RF circuitry 1406. Baseband circuitry 1404 may interface with the application circuitry 1402 for generation and processing of the baseband signals and for controlling operations of the RF circuitry 1406. For example, in some embodiments, the baseband circuitry 1404 may include a third generation (3G) baseband processor 1404*a*, a fourth generation (4G) baseband processor 1404*b*, a fifth generation (5G) baseband processor 1404*c*, or other baseband processor(s) 1404*d* for other existing generations, generations in development or to be developed in the future (e.g., second generation (2G), sixth generation (6G), etc.). The baseband circuitry 1404 (e.g., one or more of baseband processors 1404*a*-*d*) may handle various radio control functions that enable communication with one or more radio networks via the RF circuitry 1406. In other embodiments, some or all of the functionality of baseband processors 1404*a*-*d* may be included in modules stored in the memory 1404*g* and executed via a Central Processing Unit (CPU) 1404*e*. The radio control functions may include, but are not limited to, signal modulation/demodulation, encoding/decoding, radio frequency shifting, etc. In some embodiments, modulation/demodulation circuitry of the baseband circuitry 1404 may include Fast-Fourier Transform (FFT), precoding, or constellation mapping/demapping functionality. In some embodiments, encoding/decoding circuitry of the baseband circuitry 1404 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1404 may include one or more audio digital signal processor(s) (DSP) 1404*f*. The audio DSP(s) 1404*f* may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1404 and the application circuitry 1402 may be implemented together such as, for example, on a system on a chip (SOC).

In some embodiments, the baseband circuitry 1404 may provide for communication compatible with one or more radio technologies. For example, in some embodiments, the baseband circuitry 1404 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1404 is configured to support radio communications of more than one wireless protocol may be referred to as multi-mode baseband circuitry.

RF circuitry 1406 may enable communication with wireless networks using modulated electromagnetic radiation through a non-solid medium. In various embodiments, the RF circuitry 1406 may include switches, filters, amplifiers, etc. to facilitate the communication with the wireless network. RF circuitry 1406 may include a receive signal path which may include circuitry to down-convert RF signals received from the FEM circuitry 1408 and provide baseband signals to the baseband circuitry 1404. RF circuitry 1406 may also include a transmit signal path which may include circuitry to up-convert baseband signals provided by the baseband circuitry 1404 and provide RF output signals to the FEM circuitry 1408 for transmission.

In some embodiments, the receive signal path of the RF circuitry 1406 may include mixer circuitry 1406*a*, amplifier circuitry 1406*b* and filter circuitry 1406*c*. In some embodiments, the transmit signal path of the RF circuitry 1406 may include filter circuitry 1406*c* and mixer circuitry 1406*a*. RF circuitry 1406 may also include synthesizer circuitry 1406*d* for synthesizing a frequency for use by the mixer circuitry 1406*a* of the receive signal path and the transmit signal path. In some embodiments, the mixer circuitry 1406*a* of the receive signal path may be configured to down-convert RF signals received from the FEM circuitry 1408 based on the synthesized frequency provided by synthesizer circuitry 1406*d*. The amplifier circuitry 1406*b* may be configured to amplify the down-converted signals and the filter circuitry 1406*c* may be a low-pass filter (LPF) or band-pass filter (BPF) configured to remove unwanted signals from the down-converted signals to generate output baseband signals. Output baseband signals may be provided to the baseband circuitry 1404 for further processing. In some embodiments, the output baseband signals may be zero-frequency baseband signals, although this is not a requirement. In some embodiments, mixer circuitry 1406*a* of the receive signal path may comprise passive mixers, although the scope of the embodiments is not limited in this respect.

In some embodiments, the mixer circuitry 1406*a* of the transmit signal path may be configured to up-convert input baseband signals based on the synthesized frequency provided by the synthesizer circuitry 1406*d* to generate RF output signals for the FEM circuitry 1408. The baseband signals may be provided by the baseband circuitry 1404 and may be filtered by filter circuitry 1406*c*.

In some embodiments, the mixer circuitry 1406*a* of the receive signal path and the mixer circuitry 1406*a* of the transmit signal path may include two or more mixers and may be arranged for quadrature downconversion and upconversion, respectively. In some embodiments, the mixer circuitry 1406*a* of the receive signal path and the mixer circuitry 1406*a* of the transmit signal path may include two or more mixers and may be arranged for image rejection (e.g., Hartley image rejection). In some embodiments, the mixer circuitry 1406a of the receive signal path and the mixer circuitry 1406a may be arranged for direct downconversion and direct upconversion, respectively. In some embodiments, the mixer circuitry 1406a of the receive signal path and the mixer circuitry 1406a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1406 may include analog-to-digital converter (ADC) and digital-to-analog converter (DAC) circuitry and the baseband circuitry 1404 may include a digital baseband interface to communicate with the RF circuitry 1406.

In some dual-mode embodiments, a separate radio IC circuitry may be provided for processing signals for each spectrum, although the scope of the embodiments is not limited in this respect.

In some embodiments, the synthesizer circuitry 1406d may be a fractional-N synthesizer or a fractional N/N+1 synthesizer, although the scope of the embodiments is not limited in this respect as other types of frequency synthesizers may be suitable. For example, synthesizer circuitry 1406d may be a delta-sigma synthesizer, a frequency multiplier, or a synthesizer comprising a phase-locked loop with a frequency divider.

The synthesizer circuitry 1406d may be configured to synthesize an output frequency for use by the mixer circuitry 1406a of the RF circuitry 1406 based on a frequency input and a divider control input. In some embodiments, the synthesizer circuitry 1406d may be a fractional N/N+1 synthesizer.

In some embodiments, frequency input may be provided by a voltage controlled oscillator (VCO), although that is not a requirement. Divider control input may be provided by either the baseband circuitry 1404 or the application circuitry 1402 depending on the desired output frequency. In some embodiments, a divider control input (e.g., N) may be determined from a look-up table based on a channel indicated by the application circuitry 1402.

Synthesizer circuitry 1406d of the RF circuitry 1406 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1406 may include an IQ/polar converter.

FEM circuitry 1408 may include a receive signal path which may include circuitry configured to operate on RF signals received from one or more antennas 1410, amplify the received signals and provide the amplified versions of the received signals to the RF circuitry 1406 for further processing. FEM circuitry 1408 may also include a transmit signal path which may include circuitry configured to amplify signals for transmission provided by the RF circuitry 1406 for transmission by one or more of the one or more antennas 1410. In various embodiments, the amplification through the transmit or receive signal paths may be done solely in the RF circuitry 1406, solely in the FEM circuitry 1408, or in both the RF circuitry 1406 and the FEM circuitry 1408.

In some embodiments, the FEM circuitry 1408 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1406). The transmit signal path of the FEM circuitry 1408 may include a power amplifier (PA) to amplify input RF signals (e.g., provided by RF circuitry 1406), and one or more filters to generate RF signals for subsequent transmission (e.g., by one or more of the one or more antennas 1410).

In some embodiments, the PMC 1412 may manage power provided to the baseband circuitry 1404. In particular, the PMC 1412 may control power-source selection, voltage scaling, battery charging, or DC-to-DC conversion. The PMC 1412 may often be included when the device 1400 is capable of being powered by a battery, for example, when the device is included in a UE. The PMC 1412 may increase the power conversion efficiency while providing desirable implementation size and heat dissipation characteristics.

While FIG. 14 shows the PMC 1412 coupled only with the baseband circuitry 1404. However, in other embodiments, the PMC 14 12 may be additionally or alternatively coupled with, and perform similar power management operations for, other components such as, but not limited to, application circuitry 1402, RF circuitry 1406, or FEM circuitry 1408.

In some embodiments, the PMC 1412 may control, or otherwise be part of, various power saving mechanisms of the device 1400. For example, if the device 1400 is in an RRC_Connected state, where it is still connected to the RAN node as it expects to receive traffic shortly, then it may enter a state known as Discontinuous Reception Mode (DRX) after a period of inactivity. During this state, the device 1400 may power down for brief intervals of time and thus save power.

If there is no data traffic activity for an extended period of time, then the device 1400 may transition off to an RRC_Idle state, where it disconnects from the network and does not perform operations such as channel quality feedback, handover, etc. The device 1400 goes into a very low power state and it performs paging where again it periodically wakes up to listen to the network and then powers down again. The device 1400 may not receive data in this state, in order to receive data, it must transition back to RRC_Connected state.

An additional power saving mode may allow a device to be unavailable to the network for periods longer than a paging interval (ranging from seconds to a few hours).

During this time, the device is totally unreachable to the network and may power down completely. Any data sent during this time incurs a large delay and it is assumed the delay is acceptable.

Processors of the application circuitry 1402 and processors of the baseband circuitry 1404 may be used to execute elements of one or more instances of a protocol stack. For example, processors of the baseband circuitry 1404, alone or in combination, may be used execute Layer 3, Layer 2, or Layer 1 functionality, while processors of the application circuitry 1402 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 15:
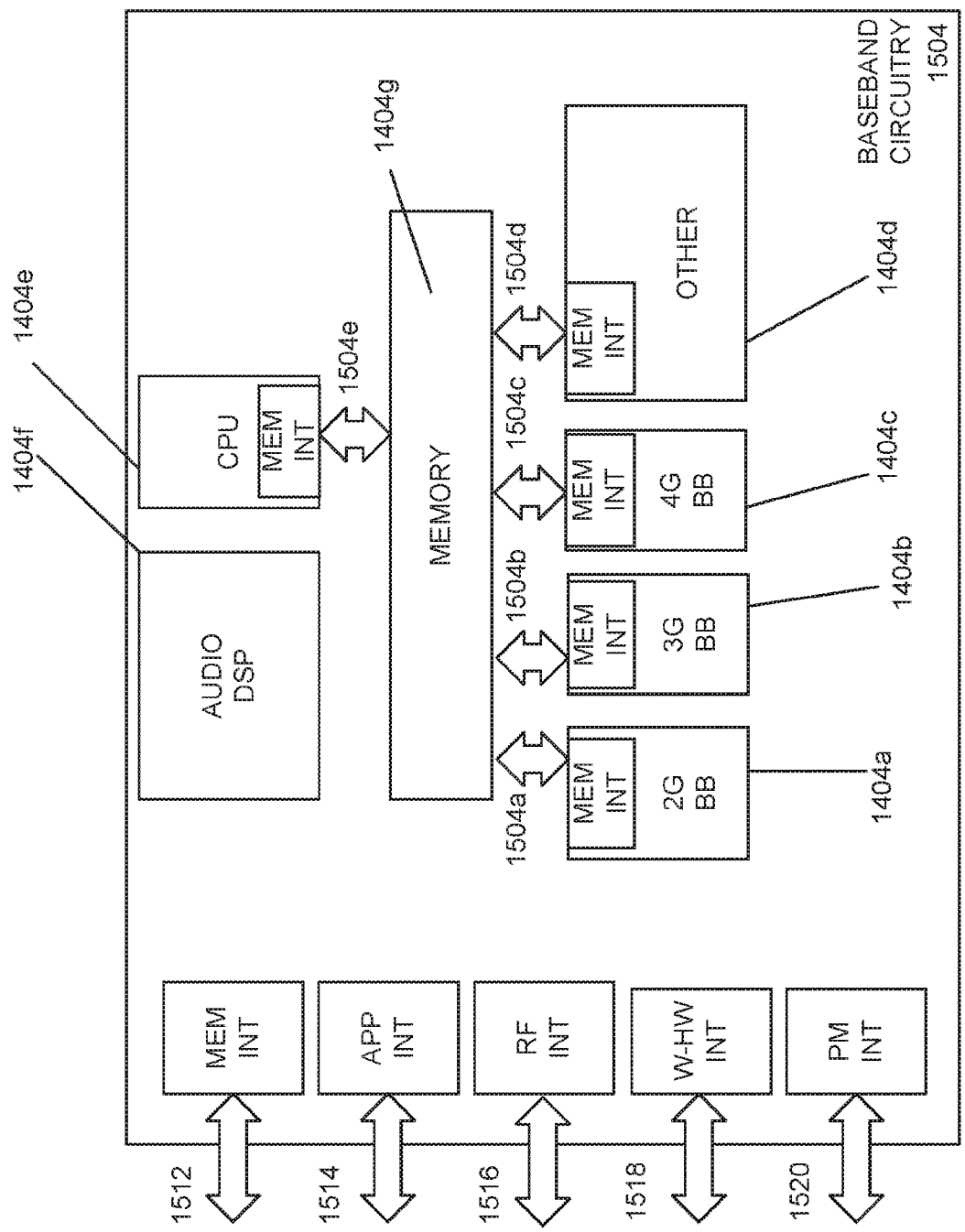
FIG. 15 illustrates interfaces of baseband circuitry in accordance with an example.

FIG. 15 illustrates example interfaces of baseband circuitry in accordance with some embodiments. As discussed above, the baseband circuitry 1404 of FIG. 14 may comprise processors 1404a-1404e and a memory 1404g utilized by said processors. Each of the processors 1404a-1404e may include a memory interface, 1504a-1504e, respectively, to send/receive data to/from the memory 1404g.

The baseband circuitry 1404 may further include one or more interfaces to communicatively couple to other circuitries/devices, such as a memory interface 1512 (e.g., an interface to send/receive data to/from memory external to the baseband circuitry 1404), an application circuitry interface 1514 (e.g., an interface to send/receive data to/from the application circuitry 1402 of FIG. 14), an RF circuitry interface 1516 (e.g., an interface to send/receive data to/from RF circuitry 1406 of FIG. 14), a wireless hardware connectivity interface 1518 (e.g., an interface to send/receive data to/from Near Field Communication (NFC) components, Bluetooth® components (e.g., Bluetooth® Low Energy), Wi-Fi® components, and other communication components), and a power management interface 1520 (e.g., an interface to send/receive power or control signals to/from the PMC 1412.

Figure 16:
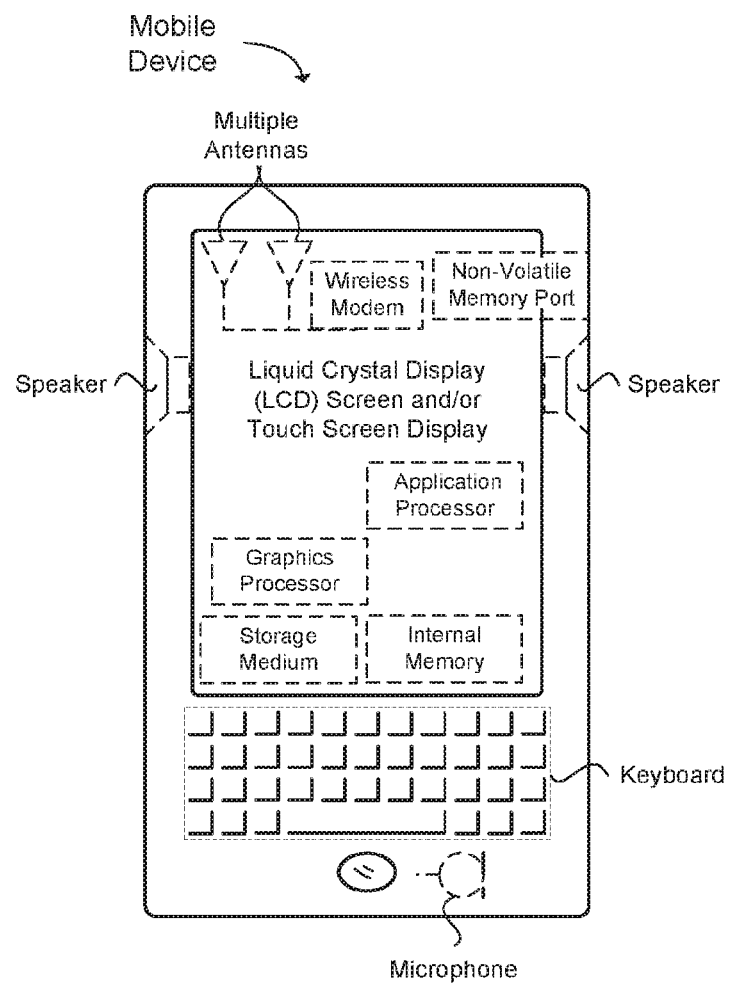
FIG. 16 illustrates a diagram of a wireless device (e.g., UE) in accordance with an example.

FIG. 16 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN) or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 16 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a Next Generation NodeB (gNB) operable to encode a physical uplink control channel (PUCCH) resource indicator field length for transmission to a user equipment (UE) for enhanced Ultra Reliable Low Latency Communications (URLLC) (eU-RLLC), the apparatus comprising: one or more processors configured to: determine, at the gNB, the PUCCH resource indicator field length that indicates a length of a PUCCH resource indicator field, wherein the PUCCH resource indicator field length is related to transmission of a number of PUCCH symbols for eURLLC; and encode, at the gNB, the PUCCH resource indicator field length for transmission in downlink control information (DCI) to the UE; and a memory interface configured to send to a memory the PUCCH resource indicator field length.

Example 2 includes the apparatus of Example 1, further comprising a transceiver configured to transmit the PUCCH resource indicator field length to the UE.

Example 3 includes the apparatus of any of Examples 1 to 2, wherein the one or more processors are configured to encode the PUCCH resource indicator field length for transmission via radio resource control (RRC) signaling.

Example 4 includes the apparatus of any of Examples 1 to 3, wherein the PUCCH resource indicator field length is a PUCCH resource indicator length (PUCCH-ResourceIndicatorLength) parameter included in a PUCCH configuration (PUCCH-Config) information element (IE), wherein the PUCCH resource indicator length parameter has a value of 3, 4 or 5.

Example 5 includes the apparatus of any of Examples 1 to 4, wherein the one or more processors are configured to encode the PUCCH resource indicator field length for transmission via a medium access control (MAC) control element (CE).

Example 6 includes the apparatus of any of Examples 1 to 5, wherein the MAC CE includes a serving cell identifier, a downlink bandwidth part (BWP) identifier, a control resource set (CORESET) identifier, and a PUCCH resource indication length that indicates the PUCCH resource indicator field length in the DCI.

Example 7 includes an apparatus of a Next Generation NodeB (gNB) operable to encode a physical uplink control channel (PUCCH) power control value for transmission to a user equipment (UE) for enhanced Ultra Reliable Low Latency Communications (URLLC) (eURLLC), the apparatus comprising: one or more processors configured to: determine, at the gNB, the PUCCH power control value related to eURLLC; encode, at the gNB, the PUCCH power control value for transmission to the UE; and a memory interface configured to send to a memory the PUCCH power control value.

Example 8 includes the apparatus of Example 7, further comprising a transceiver configured to transmit the PUCCH power control value to the UE.

Example 9 includes the apparatus of any of Examples 7 to 8, wherein the one or more processors are configured to encode the PUCCH power control value for transmission via radio resource control (RRC) signaling.

Example 10 includes the apparatus of any of Examples 7 to 9, wherein the PUCCH power control value is a PUCCH transmit power control (TPC) value "PUCCH-tpcStep" parameter included in a PUCCH power control (PUCCH-PowerControl) information element (IE), wherein the PUCCH TPC value parameter has a value of 0.25 decibels (dB), 0.5 dB, 1 dB or 2 dB.

Example 11 includes the apparatus of any of Examples 7 to 10, wherein the PUCCH power control value is a maximum number of supported transmit power control (TPC) values (maxNrofPUCCH-TpcStep) parameter included in a PUCCH power control (PUCCH-PowerControl) information element (IE), wherein the maximum number of supported TPC values parameter has a value of 0.25 decibels (dB), 0.5 dB, 1 dB or 2 dB.

Example 12 includes the apparatus of any of Examples 7 to 11, wherein the one or more processors are configured to encode a PUCCH spatial relation information (PUCCH-SpatialRelationInfo) information element (IE) that includes a transmit power control (TPC) value identifier (tpcStep-Id) that signals an index of a selected PUCCH TPC value (PUCCH-TpcStep) in a PUCCH TPC value set (pucchTpcStepSet) defined in the PUCCH-PowerControl IE.

Example 13 includes the apparatus of any of Examples 7 to 12, wherein the one or more processors are configured to encode the PUCCH power control value for transmission via a medium access control (MAC) control element (CE).

Example 14 includes the apparatus of any of Examples 7 to 13, wherein the MAC CE includes a serving cell identifier, a downlink bandwidth part (BWP) identifier, a PUCCH spatial relation information (SRI) identifier, a P0 (reference power) identifier and a transmit power control (TPC) value identifier.

Example 15 includes at least one machine readable storage medium having instructions embodied thereon for encoding a physical uplink control channel (PUCCH) resource indicator field length for transmission from a Next Generation NodeB (gNB) to a user equipment (UE), the instructions when executed by one or more processors perform the following: determining, at the gNB, the PUCCH resource indicator field length that indicates a length of a PUCCH resource indicator field, wherein the PUCCH resource indicator field length is related to transmission of a number of PUCCH symbols for eURLLC; and encoding, at the gNB, the PUCCH resource indicator field length for transmission in downlink control information (DCI) to the UE.

Example 16 includes the at least one machine readable storage medium of Example 15, further comprising instructions when executed perform the following: encoding the PUCCH resource indicator field length for transmission via radio resource control (RRC) signaling.

Example 17 includes the at least one machine readable storage medium of any of Examples 15 to 16, wherein the PUCCH resource indicator field length is a PUCCH resource indicator length (PUCCH-ResourceIndicatorLength) parameter included in a PUCCH configuration (PUCCH-Config) information element (IE), wherein the PUCCH resource indicator length parameter has a value of 3, 4 or 5.

Example 18 includes the at least one machine readable storage medium of any of Examples 15 to 17, further comprising instructions when executed perform the following: encoding the PUCCH resource indicator field length for transmission via a medium access control (MAC) control element (CE), wherein the MAC CE includes a serving cell identifier, a downlink bandwidth part (BWP) identifier, a control resource set (CORESET) identifier, and a PUCCH resource indication length that indicates the PUCCH resource indicator field length in the DCI.

Example 19 includes at least one machine readable storage medium having instructions embodied thereon for encoding a physical uplink control channel (PUCCH) power control value for transmission from a Next Generation NodeB (gNB) to a user equipment (UE), the apparatus comprising: determining, at the gNB, the PUCCH power control value related to eURLLC; and encoding, at the gNB, the PUCCH power control value for transmission to the UE.

Example 20 includes the at least one machine readable storage medium of Example 19, further comprising instructions when executed perform the following: encoding the PUCCH power control value for transmission via radio resource control (RRC) signaling.

Example 21 includes the at least one machine readable storage medium of any of Examples 19 to 20, wherein the PUCCH power control value is a PUCCH transmit power control (TPC) value "PUCCH-tpcStep" parameter included in a PUCCH power control (PUCCH-PowerControl) information element (IE), wherein the PUCCH TPC value parameter has a value of 0.25 decibels (dB), 0.5 dB, 1 dB or 2 dB.

Example 22 includes the at least one machine readable storage medium of any of Examples 19 to 21, wherein the PUCCH power control value is a maximum number of supported transmit power control (TPC) values (maxNrofPUCCH-TpcStep) parameter included in a PUCCH power control (PUCCH-PowerControl) information element (IE), wherein the maximum number of supported TPC values parameter has a value of 0.25 decibels (dB), 0.5 dB, 1 dB or 2 dB.

Example 23 includes the at least one machine readable storage medium of any of Examples 19 to 22, further comprising instructions when executed perform the following: encoding a PUCCH spatial relation information (PUCCH-SpatialRelationInfo) information element (IE) that includes a transmit power control (TPC) value identifier (tpcStep-Id) that signals an index of a selected PUCCH TPC value (PUCCH-TpcStep) in a PUCCH TPC value set (pucchTpcStepSet) defined in the PUCCH-PowerControl IE.

Example 24 includes the at least one machine readable storage medium of any of Examples 19 to 23, wherein the one or more processors are configured to encode the PUCCH power control value for transmission via a medium access control (MAC) control element (CE), wherein the MAC CE includes a serving cell identifier, a downlink bandwidth part (BWP) identifier, a PUCCH spatial relation information (SRI) identifier, a P0 (reference power) identifier and a transmit power control (TPC) value identifier.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. An apparatus of a Next Generation NodeB (gNB) operable to encode a physical uplink control channel (PUCCH) resource indicator field length for transmission to a user equipment (UE) for enhanced Ultra Reliable Low Latency Communications (URLLC) (eURLLC), the apparatus comprising:
  one or more processors configured to:
    determine, at the gNB, the PUCCH resource indicator field length that indicates a length of a PUCCH resource indicator field, wherein the PUCCH resource indicator field length is related to transmission of a number of PUCCH symbols for eURLLC; and
    encode, at the gNB, the PUCCH resource indicator field length for transmission in downlink control information (DCI) to the UE; and
  a memory interface configured to send to a memory the PUCCH resource indicator field length.

2. The apparatus of claim 1, further comprising a transceiver configured to transmit the PUCCH resource indicator field length to the UE.

3. The apparatus of claim 1, wherein the one or more processors are configured to encode the PUCCH resource indicator field length for transmission via radio resource control (RRC) signaling.

4. The apparatus of claim 3, wherein the PUCCH resource indicator field length is a PUCCH resource indicator length (PUCCH-ResourceIndicatorLength) parameter included in a PUCCH configuration (PUCCH-Config) information element (IE), wherein the PUCCH resource indicator length parameter has a value of 3, 4 or 5.

5. The apparatus of claim 1, wherein the one or more processors are configured to encode the PUCCH resource indicator field length for transmission via a medium access control (MAC) control element (CE).

6. The apparatus of claim 5, wherein the MAC CE includes a serving cell identifier, a downlink bandwidth part (BWP) identifier, a control resource set (CORESET) identifier, and a PUCCH resource indication length that indicates the PUCCH resource indicator field length in the DCI.

7. At least one non-transitory machine readable storage medium having instructions embodied thereon for encoding a physical uplink control channel (PUCCH) resource indicator field length for transmission from a Next Generation NodeB (gNB) to a user equipment (UE), the instructions when executed by one or more processors perform the following:
  determining, at the gNB, the PUCCH resource indicator field length that indicates a length of a PUCCH resource indicator field, wherein the PUCCH resource indicator field length is related to transmission of a number of PUCCH symbols for enhanced Ultra Reliable Low Latency Communications (URLLC) (eURLLC); and
  encoding, at the gNB, the PUCCH resource indicator field length for transmission in downlink control information (DCI) to the UE.

8. The at least one non-transitory machine readable storage medium of claim 7, further comprising instructions when executed perform the following: encoding the PUCCH resource indicator field length for transmission via radio resource control (RRC) signaling.

9. The at least one non-transitory machine readable storage medium of claim 8, wherein the PUCCH resource indicator field length is a PUCCH resource indicator length (PUCCH-ResourceIndicatorLength) parameter included in a PUCCH configuration (PUCCH-Config) information element (IE), wherein the PUCCH resource indicator length parameter has a value of 3, 4 or 5.

10. The at least one non-transitory machine readable storage medium of claim 7, further comprising instructions when executed perform the following: encoding the PUCCH resource indicator field length for transmission via a medium access control (MAC) control element (CE), wherein the MAC CE includes a serving cell identifier, a downlink bandwidth part (BWP) identifier, a control resource set (CORESET) identifier, and a PUCCH resource indication length that indicates the PUCCH resource indicator field length in the DCI.

* * * * *